United States Patent
Shusterman et al.

(10) Patent No.: US 8,280,028 B1
(45) Date of Patent: Oct. 2, 2012

(54) SYSTEM AND METHOD FOR INDICATING CALL PRIORITY

(75) Inventors: Alex Shusterman, Vienna, VA (US);
Frank A. Celentano, Damascus, MD (US); Ajay Gupta, Oakton, VA (US)

(73) Assignee: Nextel Communications, Inc., Reston, VA (US)

( * ) Notice: Subject to any disclaimer, the term of this patent is extended or adjusted under 35 U.S.C. 154(b) by 1106 days.

(21) Appl. No.: 11/690,749

(22) Filed: Mar. 23, 2007

(51) Int. Cl.
*H04M 7/00* (2006.01)

(52) U.S. Cl. ........... 379/221.14; 379/88.12; 379/102.07; 370/395.42; 370/395.43; 455/527; 455/512; 455/435.3

(58) Field of Classification Search .............. 379/88.19, 379/88.21–88.22, 88.25, 93.32, 354, 355.02, 379/355.05, 355.07, 142.05, 142.06, 201.01, 379/201.04; 455/412.1, 412.2, 414.1, 414.2, 455/404.01–404.03, 566, 415, 466, 550.1

See application file for complete search history.

(56) References Cited

U.S. PATENT DOCUMENTS

| | | | |
|---|---|---|---|
| 6,101,255 A * | 8/2000 | Harrison et al. | 380/52 |
| 6,771,755 B1 * | 8/2004 | Simpson | 379/142.04 |
| 6,956,831 B1 * | 10/2005 | Mahr | 370/310 |
| 7,123,707 B1 * | 10/2006 | Hiri et al. | 379/215.01 |
| 2003/0078033 A1 * | 4/2003 | Sauer et al. | 455/412 |
| 2003/0128821 A1 * | 7/2003 | Luneau et al. | 379/88.21 |
| 2004/0120477 A1 * | 6/2004 | Nguyen et al. | 379/88.19 |
| 2004/0196868 A1 * | 10/2004 | King | 370/468 |
| 2004/0209640 A1 * | 10/2004 | Urban et al. | 455/550.1 |
| 2005/0094788 A1 * | 5/2005 | Lipton et al. | 379/142.01 |
| 2005/0159160 A1 * | 7/2005 | Chambers et al. | 455/445 |
| 2006/0045252 A1 | 3/2006 | Gorti et al. | |
| 2006/0198508 A1 * | 9/2006 | Delaney et al. | 379/221.12 |
| 2007/0183493 A1 * | 8/2007 | Kimpe | 375/240.1 |
| 2007/0214206 A1 * | 9/2007 | Malloy et al. | 709/200 |
| 2008/0014971 A1 * | 1/2008 | Morin et al. | 455/466 |
| 2010/0067449 A1 * | 3/2010 | Chen | 370/329 |

OTHER PUBLICATIONS

Conversion Table, Apr. 24, 2002.*
Rosenberg et al, RFC 3261, 2002, al pages.*

* cited by examiner

*Primary Examiner* — Joseph J Nguyen

(57) ABSTRACT

System and method for providing a telecommunication transmission from an originating device to a terminating device over a telecommunications network. In one embodiment a bit code may be received from the telecommunication network, such that the bit code is extracted from the telecommunication transmission from the originating device. A directory number associated with the originating source may be received and a predefined message may be determined based at least on the directory number and bit code. The predefined message may be displayed on the terminating device.

22 Claims, 4 Drawing Sheets

| Short Code 505 | Bit Code 510 | Message Priority 515 | Predefined Message 520 |
|---|---|---|---|
| *11 | 001 | Very Low | Chat ? |
| *12 | 010 | Low | I have a question? |
| *13 | 011 | Low-Medium | Let's meet |
| *14 | 100 | Medium | Where are you? |
| *15 | 101 | Medium-High | I'm Running Late |
| *16 | 110 | High | URGENT, PICK UP |
| *17 | 111 | Very High | EMERGENCY |

SYSTEM AND METHOD FOR INDICATING CALL PRIORITY

FIELD OF THE INVENTION

The present invention relates in general to a system and method for providing predefined messages related to an incoming telecommunication transmission.

BACKGROUND

Current telecommunication devices for notification of an incoming transmission provide caller identification information (e.g., caller ID) during notification of the transmission. Caller ID may be relied upon by users in determining whether or not to answer an incoming transmission. Further Caller ID information may also be used to notify users of directory information of missed transmissions. However, conventional systems do not provide for predefined messages to be transmitted in association with an incoming transmission request. Further indication of a call priority level with predefined messages to an end user during notification of the transmission is also not addressed by prior teachings.

Currently, high-priority emergency telephone calls may be routed by one of Wireless Priority Service (WPS) and the Government Emergency Telecommunications Service (GETS) to avoid congestion on telephone networks. These systems may be used to provide a higher probability of call completion. However, these services do not address entering of or presentation of priority information to an end user during notification of an incoming transmission. Further these services are also limited to routing of a transmission through a carrier network and do not provide teachings of customizing transmission priority levels.

Accordingly, there is a need in the art to provide predefined messages, such as a transmission priority level, to an end user, but also to provide carrying such information across networks to a called party.

BRIEF SUMMARY OF THE INVENTION

Disclosed and claimed herein are systems and methods for providing a telecommunication transmission from an originating device to a terminating device over a telecommunications network. In one embodiment, a method includes receiving a bit code from the telecommunication network, wherein the bit code is extracted from the telecommunication transmission. The method further includes receiving a directory number associated with the originating device, determining a predefined message based at least on the directory number and bit code, and displaying the predefined message on the terminating device.

Other aspects, features, and techniques of the invention will be apparent to one skilled in the relevant art in view of the following detailed description of the invention.

BRIEF DESCRIPTION OF THE DRAWINGS

FIG. 4 is an exemplary view of a device for providing priority information according to one embodiment; and FIG. 5 is an exemplary view of a table providing predefined messages according to one embodiment.

DETAILED DESCRIPTION OF EXEMPLARY EMBODIMENTS

Figure 1:
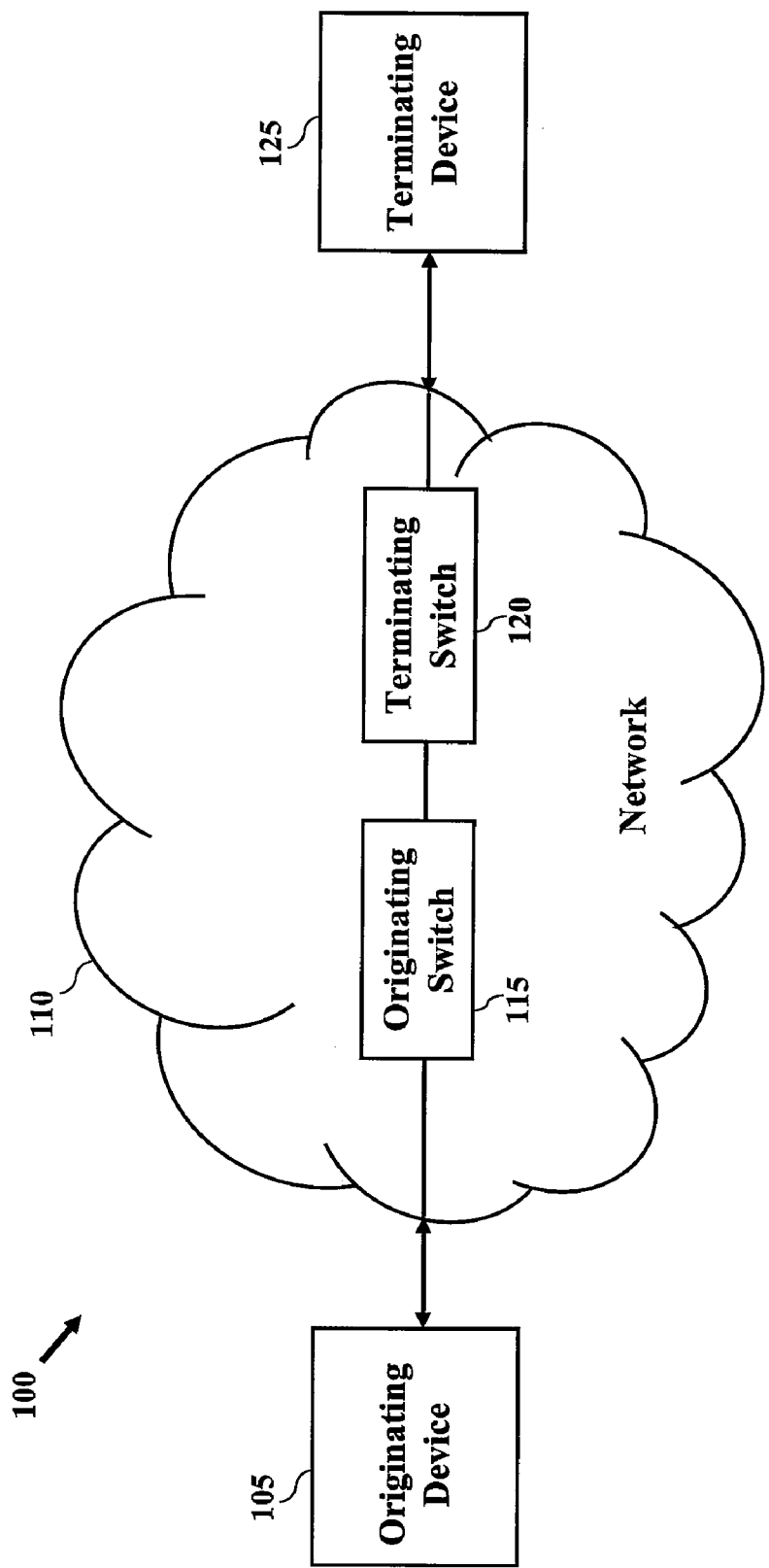
FIG. 1 depicts embodiments of simplified system diagram of one or more aspects of the invention.

One aspect of the invention is to provide a method for providing a telecommunication transmission from an originating device to a terminating device over a telecommunications network. In one embodiment of the invention a bit code may be received from the telecommunication transmission network, wherein the bit code is extracted from the telecommunication transmission from the originating device. A directory number associated with the originating source may also be received. According to another embodiment of the invention, a predefined message may be determined based at least on the directory number and bit code. The predefined message may be displayed on the terminating device.

In another embodiment, a caller group corresponding to the directory number may also be determined. A caller group may correspond to a selected group of users that may have the same predefined messages associated with a particular bit code. This may provide for recognizable messages to be transmitted within the caller group. In one embodiment of the invention, a caller group may be assigned to directory numbers not recognized by a terminating device. In another embodiment of the invention, system generated messages may be provided for a caller group. System generated messages may be used when predefined messages have not been established by a user. A plurality of predefined messages may be identified corresponding to the caller group. In yet another embodiment, determining if the bit code corresponds to the plurality of messages may also be provided.

In another embodiment, a bit code may be embedded in spare bits of the telecommunication transmission. Embedding a bit code into spare bits may provide for a priority level of a telecommunication transmission to be transmitted through a signaling portion of the transmission, enabling presentation of the priority level without effecting network routing. In one embodiment of the invention, the bit code may be extracted by a network switch associated with the terminating device. Predefined messages may be system generated messages indicating a degree of urgency for a telecommunication transmission. A predefined message may be determined by accessing one or more of a lookup table, a data structure and an array according to one or more aspects of the invention. The predefined messages may be defined by one or more of a user of an originating device, a user of said terminating device and a caller group. In one embodiment of the invention, a caller group may share a predefined message by one or more of sending a message through the system network and transferring data between devices. In one embodiment, data may be exchanged between terminal network devices through close communication ports such as infrared transmission, Bluetooth link and radio frequency (RF) links.

According to another embodiment of the invention, the telecommunication transmission may be one of a Wireless Priority Service (WPS) transmission and a Government Emergency Telecommunications Service (GETS) transmission. Bit codes may be in accordance with one of a WPS and a GETS transmission priority level. In one embodiment of the invention, priority levels associated with WPS and GETS call may be displayed on a terminating device. It can be appreciated that the telecommunication transmission may be one or more of an interconnect transmission, wireless transmission and network transmission.

In yet another embodiment, a system may be provided for a telecommunication transmission from an originating device to a terminating device over a telecommunications network. In one embodiment, the system may include an originating device configured to receive a short code from a user and to initiate a telecommunication transmission. A first network circuit may be configured to receive the short code and the telecommunication transmission. The first network circuit may embed a bit code into the telecommunication transmission that corresponds to the short code according to one embodiment of the invention. The system may also include a terminating device configured to receive a directory number associated with the originating device, receive the bit code, determine a predefined message based at least on the bit code and the directory number, provide a notification of the telecommunication transmission and display the predefined message. The system may also provide for the first network circuit to be configured to embed the bit code in spare bits of telecommunication transmission. In another embodiment of the invention the system may also include a second network circuit associated with the terminating device configured to receive the telecommunication transmission and to extract the bit code from the telecommunication transmission. In one embodiment of the invention, the predefined message may be a system generated message indicating a degree of urgency for said telecommunication transmission. It may also be appreciated that predefined messages may be set by a user of the terminating device (e.g., terminating device 125).

In one embodiment of the invention, an originating device may be configured to receive a bit code from one or more of a keypad sequence, entry from activation of a three-way switch, activation of a rotary switch, and activation of a client application. The client application may include one of a soft key and pull down menu.

In another embodiment, a computer program product may be provided for a telecommunication transmission from an originating device to a terminating device over a telecommunications network. The computer program product may include a computer usable medium having computer executable program code embodied therein to provide a telecommunication transmission. According to one aspect of the invention, the computer program product may include computer readable program code to receive a bit code the telecommunication transmission network, wherein the bit code is extracted from the telecommunication transmission from the originating device. Computer readable program code may also be provided to receive a directory number associated with the originating source and determine a predefined message based at least on said directory number and bit code. The computer readable program code may also be provided to display a predefined message on a terminating device.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The program or code segments can be stored in a processor readable medium. The "processor readable medium" may include any medium that can store or transfer information. Examples of the processor readable medium include an electronic circuit, a semiconductor memory device, a ROM, a flash memory or other non-volatile memory, a floppy diskette, a CD-ROM, an optical disk, a hard disk, a fiber optic medium, etc. The code segments may be downloaded via computer networks such as the Internet, Intranet, etc.

Referring now to FIG. 1, system 100 is presented to provide a user of a telecommunication device with a priority level of an incoming telecommunication transmission. In one embodiment, system 100 may include an originating switch 115 and a terminating switch 125 for communication via network 110. Originating device 105 may be used to enter a short code and a call party identifier (e.g., directory number) according to one embodiment of the invention. Originating device 105 may correspond to one or more of a telephone, interconnect calling device, mobile telecommunication device, fax device and telecommunication device in general. Terminating device 125 may correspond to one or more of a telephone, interconnect calling device, mobile telecommunication device, fax device and telecommunication device in general. Network 110 may comprise one of a public switched telephone network (PSTN), a wireless network, the Internet, a wide area network (WAN), a local area network (LAN), a voice over internet protocol (VoIP) network, a signaling system 7 (SS7) based PSTN, a session initiation protocol (SIP) based VoIP network and a general telecommunication transmission network. According to an additional embodiment of the invention, network 110 may utilize one or more of a soft switch, a SIP proxy, a H.323 component and an internet protocol multimedia subsystem (IMS) component. Network 110 may further provide proper mapping between signaling protocols to transport priority information from an originating network of a first type to a terminating network of a second type, (i.e. mapping for a PSTN network type to an IMS priority signaled calls network type).

In one embodiment of the invention, originating switch device 115 may be associated with the originating device 105. Originating device 105 may be configured to receive a short code corresponding to a transmission priority level and transmit the priority level to terminating switch 120 associated with a terminating device 125. According to another aspect of the invention, the transmitted priority level may be sent within spare bits of transmission signaling.

Figure 2:
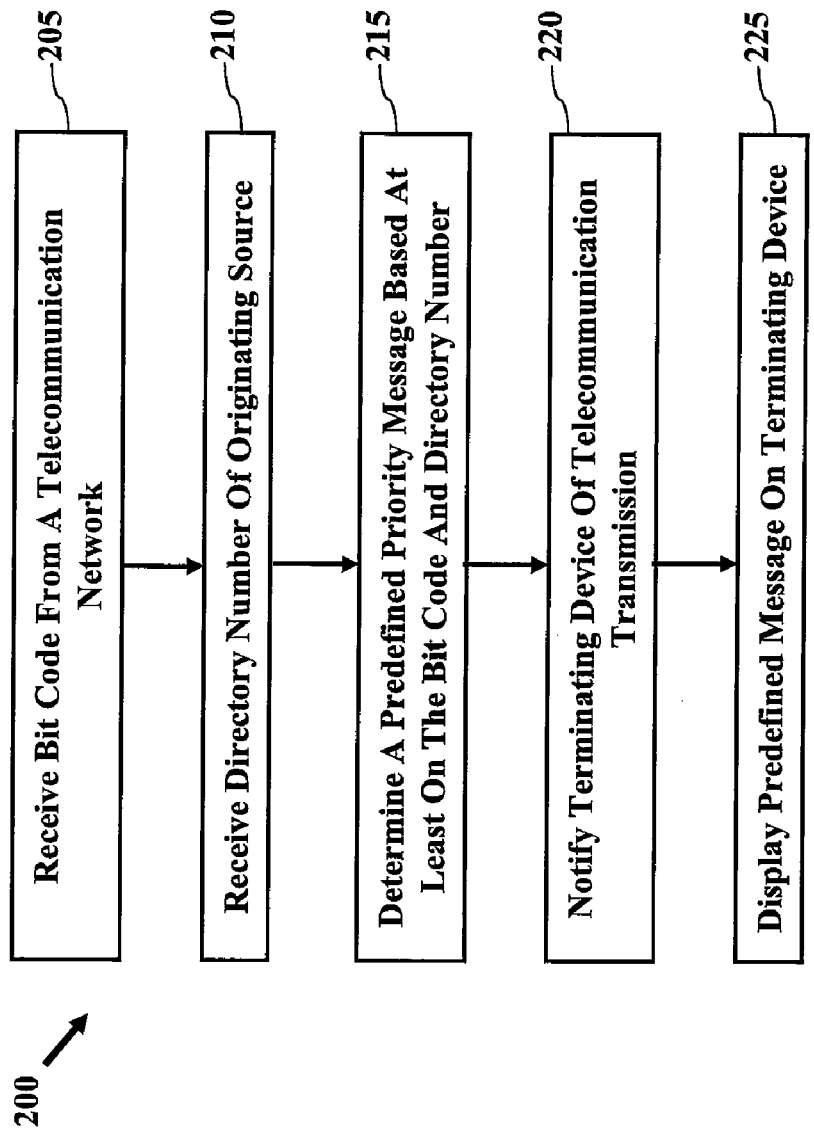
FIG. 2 depicts a process to provide priority notification according to one embodiment of the invention.

Referring to FIG. 2, a process 200 is provided to present a predefined message corresponding to a priority level of a telecommunication transmission according to one embodiment of the invention. Process 200 may be initiated by block 205 wherein a bit code may be received. In one embodiment of the invention, a three bit code may be used to indicate a desired priority level of a telecommunication transmission. In one embodiment of the invention, the bit code may be extracted by a terminating switch (e.g., terminating switch 120). Process 200 may also provide for receiving of a directory number of an originating source in block 210 according to another embodiment of the invention. The bit code may be correlated to a predefined message in block 215. Block 220 provides for notification of a terminating device (e.g., terminating device 125) of the telecommunication transmission. A predefined message may be displayed on a terminating device (e.g., terminating device 125) as depicted in block 225.

Figure 3:
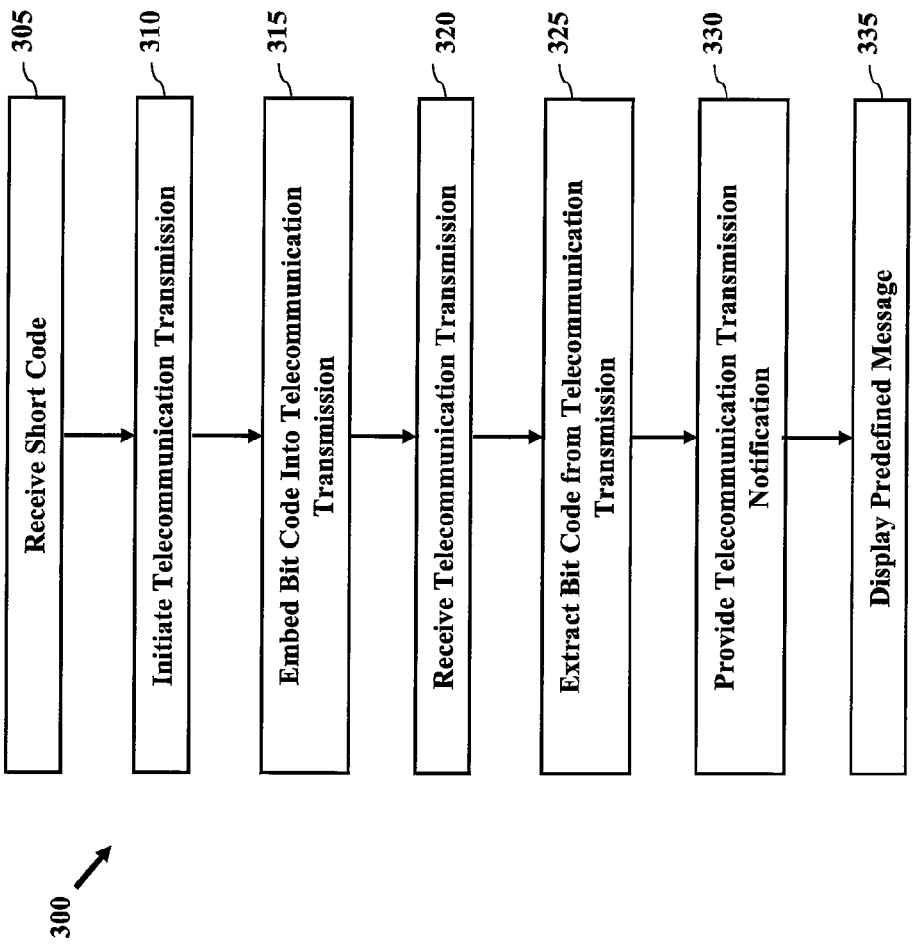
FIG. 3 depicts a process to provide a priority notification according to one embodiment of the invention.

Referring to FIG. 3, process 300 is provided to indicate priority level of a transmission according to another embodiment of the invention. Process 300 may be initiated in block 305 wherein a short code sequence may be received by an originating device (e.g., originating device 105). In one embodiment of the invention, the originating device (e.g., originating device 105) may initiate a telecommunication transmission in block 310. Block 315 provides for embedding the short code into a telecommunication transmission intended for a terminating device (e.g., terminating device 125) according to another embodiment of the invention. The bit code may be embedded by a network circuit (e.g., originating switch 115) such that the bit code is embedded into unused bits of the telecommunication transmission. The telecommunication transmission may be received by a terminating switch (e.g., terminating switch 120) associated with the terminating device (e.g., terminating device 125) in block 320 according to another aspect of the invention. A terminating switch (e.g., terminating switch 120) may extract a bit code from the telecommunication transmission in block 325. Another embodiment of the invention provides for notification of a telecommunication transmission which may be provided in block 330. Process 300 may be completed when a predefined message is displayed in block 335.

Referring to FIG. 4, an exemplary view 400 of a telecommunications device 405 is provided according to one embodiment of the invention. Device 405 may be one or more of an interconnect calling device, a mobile telephone device, a fax device, a push-to-talk device and telecommunication device. In one embodiment of the invention, telecommunications device 405 may include a switch 410, soft keys 415a-c, display 420, keypad 425 and an information sync port 430. In one embodiment of the invention, switch 410 may be a multiple stage switch which may be shifted into one of a plurality of positions to enter a short code corresponding to a desired priority level. According to one aspect of the invention, short code may correspond to a key pad entry including the star symbol and a numeric value (e.g., *11). Short code may be supplied to originating device 105 by one or more of directly entering a keypad entry and through a device feature such as a switch, configured to enter the appropriate short code. According to another embodiment of the invention, switch 410 may be one or more of a rotary switch, a push-button switch, a sliding switch and wheel switch. Telecommunications device 405 may include soft keys 415a-c which may be used to enter a short code corresponding to a desired priority level according to another embodiment of the invention. Soft keys 415a-c may be configured to present a user of the telecommunication device 405 with a menu or graphical representation containing a list of priority levels that may be attached to an outgoing communication presented on display 420. According to another aspect of the invention, keypad 425 may be used to enter a short code. According to yet another embodiment of the invention, display 420 may provide touch screen functionality to enter call priority data. Telecommunications device 405 may further be configured to enter call priority data using one or more of voice command and an external accessory electrically coupled to the telecommunication device 405.

According to another aspect of the invention, telecommunications device 405 may provide a predefined message to a user the device. A predefined message may be presented to a user by displaying the predefined message on display 420. Telecommunications device 405 may contain one or more of a lookup table, a data structure, an array, and memory containing a plurality of predefined messages. Predefined messages may be entered into telecommunications device 405 through one or more of switch 410, soft keys 415a-c and keypad 425 according to one embodiment of the invention. According to a further embodiment of the invention, a predefined message may be transmitted to telecommunications device 405 through communications port 430. Communications port 430 may be one or more of an infrared, Bluetooth, RF and close proximity communications port that may receive and transmit data to another device. In one embodiment of the invention, users may transmit or receive a plurality of predefined messages corresponding to priority levels associated with one or a plurality of identification numbers associated with external telecommunication devices. Telecommunications device 405 may display one of the aforementioned predefined messages when notifying a user of an incoming telecommunication according to one embodiment of the invention.

Referring to FIG. 5, a table 500 is depicted of priority messages that may be displayed to an end user when receiving a notification of a telecommunication transmission according to another embodiment of the invention. In one embodiment of the invention, a short code 505 may be entered by a user of an originating device (originating device 105) providing a priority level of telecommunication transmission. The short code may be converted to a bit code 510. According to another aspect of the invention, the bit code 510 may correspond to a 3 bit code value. The message value 510 may correspond to an associated message priority level 515. Message priority level may assist an end user of a terminating device (e.g., terminating device 125) in determining answering status of a particular telecommunication transmission according to one embodiment of the invention. Table 500 provides for predefined message 520. According to one embodiment of the invention, a predefined message may be one or more of a system generated message and a user defined message. According to yet another embodiment of the invention, predefined message 520 may also correspond to a caller group.

In one embodiment a caller group may correspond to a plurality of users that may share the same message settings. Users in a caller group may have messages assigned to a particular bit code. A user may be identified by a directory number associated with the particular user. In this fashion, group specific messages may be provided with call notifications based on the directory number and bit code received. In another embodiment, a caller group may correspond to directory numbers not specified in an existing caller group. For example an incoming notification with a call directory number that may be one of an unlisted number and a number not included in a specific list, may relate to messages that are predefined by the system. In this fashion, when an incoming call is received containing bit code and an unrecognized directory number, messages may still be provided to an end user.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Trademarks and copyrights referred to herein are the property of their respective owners.

What is claimed is:

1. A method for providing a telecommunication transmission associated with a request for a voice communication session from an originating device to a terminating device over a telecommunications network comprising:
    receiving a bit code over the telecommunication network, wherein the bit code is extracted from the telecommunication transmission associated with the request for the voice communication session, the bit code indicating a priority level of the telecommunication transmission;
    receiving a directory number associated with the originating device of the telecommunication transmission and the request for the voice communication session;
    determining a predefined message from a plurality of predefined messages defined for a caller group corresponding to the directory number based at least on said directory number and said bit code, the predefined message comprising a priority indicator for the telecommunication transmission associated with the request for the voice communication session; and
    displaying said predefined message on the terminating device,
    wherein said bit code is embedded in spare bits of said telecommunication transmission.

2. The method of claim 1, further comprising determining that the bit code corresponds to one of the plurality of predefined messages.

3. The method of claim 1, wherein said bit code is extracted by a network switch associated with said terminating device.

4. The method of claim 1, wherein said predefined message is a user defined message indicating a degree of urgency for said telecommunication transmission.

5. The method of claim 1 wherein said determining further comprises accessing one or more of a lookup table, a data structure and an array for said predefined message.

6. The method of claim 1, wherein said predefined messages are defined by one or more of a user of an originating device, a user of said terminating device and the caller group.

7. The method of claim 1, wherein said telecommunication transmission is one of a Wireless Priority Service (WPS) transmission and a Government Emergency Telecommunications Service (GETS) transmission, and wherein said bit code is in accordance with one of a WPS and a GETS transmission priority level.

8. A system for providing a telecommunication transmission associated with a request for a voice communication session from an originating device to a terminating device over a telecommunications network comprising:
    an originating device configured to receive a short code from a user and to initiate said telecommunication transmission and said request for the voice communication session associated with the telecommunication transmission;
    a first network circuit configured to receive said short code and the telecommunication transmission, and to embed a bit code into the telecommunication transmission associated with the request for the voice communication session that corresponds to the short code, the bit code indicating a priority level of the telecommunication transmission; and
    a terminating device configured to:
        receive a directory number associated with the originating device;
        receive the bit code;
        determine a predefined message from a plurality of predefined messages defined for a caller group corresponding to the directory number based at least on said bit code and said directory number, the predefined message comprising a priority indicator for the telecommunication transmission associated with the request for the voice communication session;
        provide a notification of said telecommunication transmission; and
        display said predefined message,
    wherein said first network circuit is configured to embed said bit code in spare bits of said telecommunication transmission.

9. The system of claim 8, further comprising a second network circuit associated with said terminating device configured to receive said telecommunication transmission and to extract said bit code from said telecommunication transmission.

10. The system of claim 8, wherein said predefined message is a user defined message indicating a degree of urgency for said telecommunication transmission.

11. The system of claim 8, wherein said determining further comprises accessing one or more of a lookup table, a data structure and an array for said predefined message.

12. The system of claim 8, wherein said predefined message is defined by one or more of a user of an originating device, a user of said terminating device and the caller group.

13. The system of claim 8, wherein said originating device is further configured to receive said bit code from one or more of a keypad sequence, a three-way switch, a rotary switch and a client application.

14. The system of claim 13, wherein said client application is one or more of a soft key and pull down menu.

15. The system of claim 8, wherein said telecommunication transmission is one of a Wireless Priority Service (WPS) transmission and a Government Emergency Telecommunications Service (GETS) transmission, and wherein said bit code is in accordance with one of a WPS and a GETS transmission priority levels.

16. A computer program product for providing a telecommunication transmission associated with a request for a voice communication system from an originating device to a terminating device over a telecommunications network comprising:
    a non-transitory computer usable medium having computer executable program code embodied therein to provide a telecommunication transmission, the computer program product having:
        computer readable program code to receive a bit code over the telecommunication network, wherein the bit code is extracted from the telecommunication transmission associated with the request for the voice communication session, the bit code indicating a priority level of the telecommunication transmission;
        computer readable program code to receive a directory number associated with the originating device of the telecommunication transmission and the request for the voice communication session;

computer readable program code to determine a predefined message from a plurality of predefined messages defined for a caller group corresponding to the directory number based at least on said directory number and bit code, the predefined message comprising a priority indicator for the telecommunication transmission associated with the request for the voice communication session; and computer readable program code to display said predefined message on the terminating device, wherein said bit code is embedded in spare bits of said telecommunication transmission.

17. The computer program product of claim 16, further comprising computer readable program code to determine that the bit code corresponds to one of the plurality of messages.

18. The computer program product of claim 16, wherein said bit code is extracted by a network switch associated with said terminating device.

19. The computer program product of claim 16, wherein said predefined message is a user defined message indicating a degree of urgency for said telecommunication transmission.

20. The computer program product of claim 16 wherein said determining further comprises accessing one or more of a lookup table, a data structure and an array for said predefined message.

21. The computer program product of claim 16, wherein said predefined messages are defined by one or more of a user of an originating device, a user of said terminating device and the caller group.

22. The computer program product of claim 16, wherein said telecommunication transmission is one of a Wireless Priority Service (WPS) transmission and a Government Emergency Telecommunications Service (GETS) transmission, and wherein said bit code is in accordance with one of a WPS and a GETS transmission priority level.

* * * * *